United States Patent
Dent et al.

(10) Patent No.: US 11,152,967 B2
(45) Date of Patent: Oct. 19, 2021

(54) CANCELLATION OF INTERFERENCE AND HARMONICS

(71) Applicant: THALES HOLDINGS UK PLC, Berkshire (GB)

(72) Inventors: Gary Dent, Berkshire (GB); Leslie David Westbrook, Berkshire (GB); Sze-Ching Lu, Berkshire (GB); Simon Delaney, Berkshire (GB)

(73) Assignee: THALES HOLDINGS UK PLC, Berkshire (GB)

( * ) Notice: Subject to any disclaimer, the term of this patent is extended or adjusted under 35 U.S.C. 154(b) by 0 days.

(21) Appl. No.: 16/549,892

(22) Filed: Aug. 23, 2019

(65) Prior Publication Data

US 2020/0067552 A1    Feb. 27, 2020

(30) Foreign Application Priority Data

Aug. 24, 2018 (GB) ...................................... 1813829

(51) Int. Cl.
*H04B 1/12* (2006.01)
*H01Q 3/26* (2006.01)
(Continued)

(52) U.S. Cl.
CPC ........... *H04B 1/126* (2013.01); *H01Q 3/2629* (2013.01); *H04B 1/0475* (2013.01);
(Continued)

(58) Field of Classification Search
CPC .... H04B 1/126; H04B 1/0475; H04B 1/1027; H04B 1/44; H01Q 3/2629; H04J 11/0023;
(Continued)

(56) References Cited

U.S. PATENT DOCUMENTS

| 4,191,926 A | 3/1980 | Pontano et al. |
| 9,252,868 B1 | 2/2016 | Bull |

(Continued)

FOREIGN PATENT DOCUMENTS

| EP | 0228786 A2 | 7/1987 |
| EP | 2753003 A1 | 7/2014 |

(Continued)

OTHER PUBLICATIONS

European Search Report from corresponding to Great Britain Application No. 1813829.7, dated Feb. 19, 2019, pp. 1-9, Intellectual Property Office, South Wales, NP.

(Continued)

*Primary Examiner* — Nguyen T Vo
(74) *Attorney, Agent, or Firm* — Hauptman Ham, LLP

(57) ABSTRACT

There is provided systems and methods for mitigating interference from an interference signal. In one implementation the system comprises cancellation circuitry configured to: receive a first signal from a first antenna, the first signal comprising an interference component deriving from the interference signal and a desired component deriving from a desired signal; and receive a second signal comprising an interference component deriving from the interference signal and received at one or more of a different antenna or a different frequency to the first signal. The interference component in the second signal is stronger than that the interference component in the first signal. The cancellation circuitry is further configured to derive a cancellation signal from the second signal; generate an output signal by subtracting the cancellation signal from the input signal to substantially remove the interference component from the first signal; and output the output signal.

15 Claims, 7 Drawing Sheets

(51) Int. Cl.
*H04B 1/04* (2006.01)
*H04B 1/10* (2006.01)
*H04B 1/44* (2006.01)
*H04J 11/00* (2006.01)
*H04L 25/02* (2006.01)
*H04L 25/03* (2006.01)
*H04L 27/26* (2006.01)

(52) U.S. Cl.
CPC ............. *H04B 1/1027* (2013.01); *H04B 1/44* (2013.01); *H04J 11/0023* (2013.01); *H04L 25/0204* (2013.01); *H04L 25/03012* (2013.01); *H04L 27/2649* (2013.01)

(58) Field of Classification Search
CPC ........... H04L 25/0204; H04L 25/03012; H04L 27/2649
See application file for complete search history.

(56) References Cited

U.S. PATENT DOCUMENTS

| | | | |
|---|---|---|---|
| 2002/0002065 A1 | 1/2002 | Mesecher et al. | |
| 2003/0021367 A1 | 1/2003 | Smith | |
| 2003/0072396 A1* | 4/2003 | Binshtok | H04B 7/0857 375/346 |
| 2004/0185815 A1* | 9/2004 | Fukuda | H04B 1/126 455/296 |
| 2004/0239559 A1 | 12/2004 | King et al. | |
| 2007/0064835 A1 | 3/2007 | Auranen | |
| 2008/0207259 A1 | 8/2008 | Rofougaran | |
| 2008/0232506 A1* | 9/2008 | Fujita | H04B 1/7174 375/295 |
| 2009/0143041 A1 | 6/2009 | Rofougaran | |
| 2012/0252392 A1* | 10/2012 | Wilkerson | H04B 1/10 455/278.1 |
| 2013/0337761 A1 | 12/2013 | Kyperountas et al. | |
| 2015/0200697 A1* | 7/2015 | Wang | H04B 1/123 455/310 |
| 2016/0218754 A1 | 7/2016 | Shi et al. | |
| 2018/0019774 A1 | 1/2018 | Hampel et al. | |
| 2018/0145709 A1* | 5/2018 | Kushioka | H04B 1/10 |
| 2019/0036231 A1* | 1/2019 | Ryu | H01Q 21/24 |
| 2019/0319651 A1* | 10/2019 | Kushioka | H04B 7/0848 |

FOREIGN PATENT DOCUMENTS

| | | |
|---|---|---|
| EP | 2996260 A1 | 3/2016 |
| EP | 3035546 A1 | 6/2016 |
| GB | 2241412 A | 8/1991 |
| WO | 0106669 A1 | 1/2001 |
| WO | 2015105810 A2 | 7/2015 |

OTHER PUBLICATIONS

Gutleber, F.S., U.S. Statutory Invention Registration No. H739, Auxiliary Antenna Interference Canceller, Feb. 6, 1990.

Zhidkov, S.V., "Analysis and Comparison of Several Simple Impulsive Noise Mitigation Schemes for OFDM Receivers," IEEE Transactions on Communications, vol. 56, No. 1, Jan. 2008, pp. 1-3.

United Kingdom Search Report issued in corresponding to Great Britain Application No. 1813829.7, dated Dec. 9, 2019, pp. 1-3, United Kingdom Intellectual Property Office, South Wales, NP.

Brandes et al., S., "Compensation of the Impact of Interference Mitigation by Pulse Blanking in OFDM Systems," German Aerospace Center (DLR), Institute of Communications and Navigation, Oberpfaffenhofen, Germany, pp. 1-6, Published 2009.

Gao, G.X., "DME/TACAN Interference and its Mitigation in L5/E5 Bands," Stamford University, CA, USA, pp. 1-10, Published Sep. 25-28, 2007.

* cited by examiner

CANCELLATION OF INTERFERENCE AND HARMONICS

TECHNICAL FIELD

The present disclosure relates to a system and method for mitigating interference from an interference signal. In particular, but without limitation, this disclosure relates to cancellation of interference from received signals.

BACKGROUND

The detection of wireless signals can be affected by interference from nearby transmission systems, for instance, a co-sited pulsed interferer radio system. Minimising the impact of co-sited interferers, including pulsed interferers, is a common problem for mobile platforms having multiple radio systems.

Filtering can be used to discriminate against out-of-band interference, but filtering is of limited benefit where the interference itself is in-band (within the frequency bandwidth of the receiving channel).

Likewise, mobile platforms offer very limited scope to vary the siting of new antennas to reduce such interference. In the case of aircraft platforms, a large number of radio systems must compete for the limited number of appropriate locations on the fuselage space, with the result that separation between antennas—and hence radio frequency isolation—is limited. The example of an aircraft, however, is but one example. Similar performance degradations occur in other applications.

It is often difficult to mitigate pulsed interference from a co-sited radio system. One approach to the mitigation of co-sited pulsed interferer radio systems, particularly on military platforms, is to use a central suppression system (or bus) which receives and distributes suppression pulses supplied over cabling by each pulse emitter on that platform.

These suppression pulses (or, more accurately, bursts—since they last for the entire emission period, which may comprise a series of pulses) can be used to suppress the impact of the interference on other electronic systems by artificially lowering the receive sensitivity during the burst. This therefore blanks or otherwise protects the receiver inputs from the interference.

This form of blanking can affect performance, for instance, by reducing the throughput of the blanked system. Furthermore, suppression over a burst may last longer than is strictly necessary as dictated by the emitted waveform. Furthermore, such systems require that each emitter that produces pulsed interference also provides a suitable suppression pulse to allow effective blanking of the interference. Furthermore, emitters—including those installed/retrofitted after initial commissioning—must be compatible with this common distribution system and need to provide a suitable suppression pulse.

The use of suppression buses is much less common in civilian aircraft, particularly aircraft for the air transport market, and in such cases individual receive systems requiring a suppression pulse must first detect the pulsed interferer from its radiation. This mechanism is less reliable than the use of a suppression bus, depending on the received interferer level.

Accordingly, there is a need for an improved means of countering in-band interference from pulsed emissions.

SUMMARY

Embodiments described herein aim to provide improved means of cancelling interference from a first received signal, and in particular, a received wireless signal. The first received signal is a first composite signal that comprises an interference component and a desired signal component. Embodiments make use of spatial, polarisation and/or frequency diversity to derive a second cancellation signal that has a much stronger interference component relative to the first composite signal to which the cancellation is being applied. By subtracting the second cancellation signal from the first composite signal, the interference component in the first signal can be more effectively removed.

According to a first aspect there is provided a system for mitigating interference from an interference signal. The system comprises cancellation circuitry configured to: receive a first signal from a first antenna, the first signal comprising an interference component deriving from the interference signal and a desired component deriving from a desired signal; and receive a second signal comprising an interference component deriving from the interference signal and received at one or more of a different antenna or a different frequency to the first signal. The interference component in the second signal is stronger than that the interference component in the first signal. The cancellation circuitry is further configured to derive a cancellation signal from the second signal; generate an output signal by subtracting the cancellation signal from the first signal to substantially remove the interference component from the first signal; and output the output signal.

Accordingly, implementations sample the interference signal separately in space, polarisation and/or frequency to derive a cancellation signal with a stronger interference component than the first signal—e.g. having a lower proportion of signals other than the interferer. Receiving the second signal using a different antenna is a form of sampling separately in space or polarisation. This could include receiving the second signal at a different antenna, antenna array, sub-array or element (where each antenna comprises multiple antenna elements) at a second location or receiving the second signal at a different antenna sub-array or element to that for the first signal at the first location, within the same antenna array, wherein the two antenna elements form part of a single MIMO system. The antenna sub-arrays or elements may be located in similar positions to each other but with different polarisations, with one polarisation being more receptive to interference due to the chosen alignment.

The interference signal may originate from an emitter at a fixed position relative to the first antenna and (if used) the second antenna, the second antenna being located closer to the emitter than the second antenna.

Receiving the second signal at a different frequency is a form of sampling separately in frequency space. That is, the second signal may be detected over a different frequency range to the first signal. This may be in addition to or instead of detection via a different antenna, antenna array, sub-array or element. Accordingly, the interference components of the first and second signals may relate to different frequency harmonics of the interference signal. The interference component of the second signal may comprise/consist of the fundamental frequency (first harmonic) of the interference signal whereas the interference component of the first signal may comprise/consist of a higher harmonic of the interference signal.

Cancellation may be performed in the analogue or digital domains. Accordingly, the first and second signals may be converted into the digital domain prior to cancellation. Alternatively, where received signals are already in the digital domain, the first and second signals may be converted into the analogue domain prior to cancellation.

As discussed, the second signal should have a stronger interference component than the first signal. The strength of the interference components could be indicated by the power or amplitude of the interference components, and their purity by the ratio of the amplitude/power of the interference component relative to that of other components in signal (e.g. relative to a desired component, as signal to noise ratio, etc.), where the power of the signal is related to the square of its amplitude.

According to a further embodiment deriving the cancellation signal comprises generating a cancellation signal based on the second signal and adjusting one or more of: an amplitude of the cancellation signal to match an amplitude of the interference component of the first signal; or a phase of the cancellation signal to match a phase of the interference component of the first signal.

Generating the cancellation signal based on the second signal may comprise inputting the second signal and adjusting the amplitude, phase and, potentially, frequency of the second signal to match the amplitude, phase and frequency of the interference component of the first signal. Accordingly, the cancellation signal may be derived by scaling and/or adding a phase change/delay to the second signal. Alternatively, the cancellation signal may be derived from the second signal (e.g. by shifting the frequency of the second signal to match that of the first signal) before the amplitude and/or phase is/are matched to that of the interference component of the first signal.

Accordingly, where generating the cancellation signal comprises inputting the second signal, deriving a cancellation signal from the second signal may comprise adjusting one or more of: an amplitude of the second signal so that an amplitude of the interference component of the second signal matches an amplitude of the interference component of the first signal; or a phase of the second signal so that a phase of the interference component of the second signal matches a phase of the interference component of the first signal.

Adjusting the amplitude or phase to match that of the first signal interference component may involve the application of one or more of a predefined gain or predefined phase shift. The predefined gain or phase shift may be determined via initial calibration. The gain may be determined prior to use, based on static measurements of the ratio of average power of the first signal to average power of the second signal for during receipt of the interference component, preferably in the absence of the desired signal (i.e. primarily including the interference component).

It will be appreciated that subtracting phase matched signals is equivalent to adding anti-phase signals. Accordingly, matching the phase and subtracting the cancellation signal from the first signal is equivalent to shifting the cancellation signal into anti-phase with the first signal and adding the cancellation signal to the first signal.

Alternatively, amplitude and/or phase may be updated periodically. For instance, the phase and/or gain may be adjusted dynamically using a feedback loop to correct for any changes in amplitude/phase.

The system may be further configured to adapt to cancel different interference signals present at different times. According to an embodiment the cancellation circuitry is further configured to: identify when a source of interference in the first signal changes based on a change to the interference component of the first signal; and in response to said identification, adjust one or more of: the amplitude of the cancellation signal to match an updated amplitude of the interference component of the first signal; or a phase of the cancellation signal to match an updated phase of the interference component of the first signal.

The change to the interference component of the first signal may be one or more of a change in amplitude (to an updated amplitude) or a change in phase (to an updated phase). The system can alternate between two or more sets of amplitudes and phases based on two or more alternating sources.

The detection of a different source of interference may be based on the application of one or more threshold levels. The detection may be by the amplitude or power of the interference component of the first signal (or amplitude or power of the first signal overall) crossing a single threshold (either exceeding or falling below the threshold) or falling within a given range between two thresholds. Additional thresholds may be used to introduce hysteresis so as to improve stability. Where more than two sources are required to be detected, each source may have its own corresponding amplitude and phase control value for application to the cancellation signal. Furthermore, each source may have its own threshold or range for detecting the respective source.

Whilst the methods and systems described herein may be applied to cancel any form of interference, the systems and methods may be specifically configured to cancel out pulsed interference.

According to an embodiment the interference signal is a pulsed interference signal comprising a series of pulses of interference; the system is configured to detect when a pulse of interference is received; and the cancellation circuitry is configured to subtract the cancellation signal from the input signal only during each pulse. By only subtracting the cancellation signal when pulsed interference is detected, and in contrast to burst suppression mentioned earlier, the system can provide improved signal quality during remaining the periods during which a pulse is not detected. A series of pulses of interference is known as a burst.

The methods and systems described herein may make use of spatial diversity to avoid degradation of the desired signal during shadowing by the mobile platform, for instance, due to a change in platform orientation or attitude. For instance, when the desired component of the first signal drops below a threshold then the system may switch to outputting the desired signal obtained via a second antenna. The threshold may be defined by the desired component of the second signal. Accordingly, when the desired component of the first signal drops below the desired component of the second signal, then the system may switch to outputting the desired component of the second signal, and vice versa.

Such spatial diversity also provides a means to obtain a stronger interferer component in the second signal from the second antenna as compared to the first signal from the first antenna. Consequently, it is desirable to use the interference component of the second signal from the second antenna to cancel the interference component of the first signal from the first antenna where possible. However, when shadowing results in degradation of the wanted component of the first signal from the first antenna the system switches to the second antenna. In such a case, cancellation may no longer be possible and the system may revert to the use of pulse blanking for mitigating the interference in the second signal.

According to an embodiment the second signal is obtained via a second antenna, the second signal comprises a desired component deriving from the desired signal and the system is configured to, in response to the desired component of the first signal falling below one or more of a predefined threshold or a predefined level relative to the desired component of the second signal, output a pulse blanked version of the second signal.

A pulse blanked version of either the first or second signal may be output by disconnecting the output and/or setting the output of the second signal to zero (or essentially zero) for the period of each interference pulse. Each pulse of interference may be detected based on a threshold level of interference (e.g. based on received power/received signal strength exceeding a threshold).

Multiple antenna elements within spatially separate antennas may be used, with pairs of antenna elements with corresponding polarisations being used in the cancellation scheme described herein. This scheme has the advantage that the necessary amplitude scaling and phase delays of the respective cancellation signals will be essentially the same for each pair of elements.

According to an embodiment the first signal is obtained via a first antenna element of the first antenna, the second signal is obtained via a first antenna element of a second antenna, wherein each of the first and second antennas comprises a plurality of antenna elements, and wherein the first antenna element of the first antenna has the same polarisation as the first antenna element of the second antenna.

According to a further embodiment the cancellation circuitry is further configured to, for each antenna element in the first antenna: receive, from the respective antenna element in the first antenna, a corresponding signal comprising an interference component deriving from the interference signal and a desired component deriving from a corresponding desired signal; receive, from each antenna element in the second antenna that shares the same polarisation as the respective antenna element of the first antenna, a respective signal comprising an interference component deriving from the interference signal; derive a corresponding cancellation signal for the respective antenna of the first antenna based on the respective signal from each antenna element in the second antenna that shares the same polarisation as the respective antenna element of the first antenna; and generate a corresponding output signal by subtracting the corresponding cancellation signal from the corresponding signal to substantially remove the interference component from the corresponding signal; and output the corresponding output signal.

Alternatively, a cancellation signal may be derived from the antenna/sub-array/antenna element with the strongest interference component (i.e. the second signal can be chosen as the signal from a set of signals that has the strongest interference component).

According to an embodiment the system is configured to choose the second signal from a set of signals, each comprising a corresponding interference component deriving from the interference signal, wherein the second signal is chosen as the signal from the set of signals that has the strongest interference component.

The strongest inference component may be strongest in terms of overall power/signal strength and/or in terms of its strength (amplitude/power) relative to other components in the signal (e.g. signal to noise ratio of the interference component).

Waveforms employed in many modern wireless systems already provide limited resilience to occasional bursts of interference, primarily through the use of forward error correction and interleaving. It may therefore be advantageous to only apply cancellation when the interference component of the first signal is stronger than a predefined threshold strength. This can ensure that cancellation is only applied in situations where the interference is so significant that the system may otherwise be unable to militate against it.

According to an embodiment the output signal is generated by subtracting the cancellation signal from the first signal in response to a determination that the strength of the interference component of the first signal is greater than a predefined threshold interference strength. Again, the strength may be in terms of amplitude, power and/or as a ratio relative to other components in the first signal. Equally, the threshold interference strength may be a threshold ratio of interference relative to the desired component, a predefined ratio relative to the interference component of the second signal or a predefined amplitude/power of the interference component of the first signal.

As mentioned, the first and second signals may be sampled in different frequency ranges. For instance, the first and second signals may include different harmonics of the interference signal.

According to an embodiment the system further comprises a first filter configured to pass the first signal at a first frequency and a second filter configured to pass the second signal at a second frequency that is different to the first frequency. Accordingly, the interference component of the first signal may comprise a different harmonic of the interference signal to the interference component of the second signal. The first and second filters may pass different frequency ranges. These different frequency ranges may be non-overlapping.

According to an embodiment the first and second signals are received at the first antenna and passed to the first and second filters. The first and second signals may therefore be different filtered aspects of a combined received signal received at the same antenna. The processing of first and second signals may be performed in parallel.

The system may comprise a splitter configured to split a received signal received at the first antenna into the first and second signals, wherein the second signal is substantially smaller than the first signal. This mitigates any effect on the first signal.

Alternatively, the first and second signals may be received both at different antennas and at different frequencies.

According to an embodiment the first and second frequencies are different harmonic frequencies of the interference signal. According to a further embodiment the second frequency is a fundamental frequency of the interference signal and the first frequency is a higher harmonic frequency than the fundamental frequency. More generally, the interference component of the first signal may be a higher harmonic than the interference component of the second signal.

Where the first and second signals are sampled in different frequency ranges, the cancellation signal may be generated by shifting the frequency of the interference component of the second signal to equal the frequency of the interference component of the first signal.

According to an embodiment deriving the cancellation signal from the second signal comprises generating a replica interference signal at the first frequency based on the second signal. This may be through a transformation of the second signal to the first frequency, for instance, via a non-linear circuit/function.

The embodiments described herein may be applied to any interference scenario. Nevertheless, there is a particular need for mitigating interference within the frequency range for air to ground communication (ATG) (e.g. one based on long-term evolution (LTE) communication) caused by air traffic control (ATC) signals. Accordingly, the first signal may be an ATG signal and the second signal may be an ATC signal. This need arises in LTE ATG communications in the 2170-2200 MHz MSS (receive)_band from the fact that the second harmonic of ATC signals falls at 2180 MHz, which is within the receiving range for LTE communication. Accordingly, the interference component of second signal may relate to the ATC fundamental frequency at 1090 MHz, whereas the interference component of first signal may relates to the second harmonic of the ATC signal at 2180 MHz.

The systems described herein may equally be applied as methods for mitigating interference.

According to a further aspect there is provided a method for mitigating interference from an interference signal, the method comprising cancellation circuitry: receiving a first signal from a first antenna, the first signal comprising an interference component deriving from the interference signal and a desired component deriving from a desired signal; receiving a second signal comprising an interference component deriving from the interference signal and received at one or more of a different antenna or a different frequency to the first signal, wherein the interference component in the second signal is stronger than that the interference component in the first signal; deriving a cancellation signal from the second signal; generating an output signal by subtracting the cancellation signal from the input signal to substantially remove the interference component from the first signal; and outputting the output signal.

In light of the above, it can be seen that by sampling an interference signal at a different antenna or different frequency, a cancellation signal can be generated to effectively cancel out the interference component in a received signal.

Further embodiments mitigate interference by detecting when interference is present and blanking out the received signal for the duration of the interference. Improved detection and blanking can be achieved by detecting the interference over a different range of frequencies to the range of frequencies over which the desired signal is received (the receive channel). For instance, where interference over the receive channel is caused by a higher harmonic of the interference signal, the interference signal may be detected via its fundamental frequency (or another harmonic that is stronger than the harmonic causing the interference).

According an embodiment there is provided a system for mitigating interference from an interference signal, the system comprising: an input configured to receive an input signal from an antenna; receiver circuitry connected to the input and configured to process the input signal and output an output signal, the receiver circuitry comprising a blanking module and a first filter configured to filter the input signal to pass a first range of frequencies for output; an output configured to output the output signal; and an interference detection module connected to the input. The interference detection module comprises a second filter configured to filter the input signal to pass a second range of frequencies that is different to the first range of frequencies. The interference detection module is configured to detect when the interference signal has been received by the antenna based on the filtered input signal in the second range of frequencies and the blanking module is configured to isolate the output from the input to blank the output signal when the interference signal is detected.

Where the interference is caused by a pulsed interference signal, the system may be configured to blank the output signal for only the duration of the interference. This can be advantageous compared to other systems that may blank the whole pulse train.

According to an embodiment the interference signal is a pulsed interference signal and the blanking module is configured to isolate the output from the input for the duration of each pulse and to connect the output to output the output signal in between pulses.

The receiver circuitry is configured to process the input signal. The processing could include blanking. In addition, processing could include amplification, filtering and/or demodulation of the input signal.

According to an embodiment the interference detection module is configured to detect a pulse of the pulsed interference signal whenever the pulsed interference signal exceeds a predetermined threshold. This threshold may be based on average signal level or signal power or may be a fraction of a peak signal level.

According to an embodiment the interference signal is stronger in the second range of frequencies than in the first range of frequencies. This makes it easier to detect the interference in the second range of frequencies.

According to a further embodiment the interference detection module is configured to detect a harmonic of the interference signal that falls within the second range of frequencies and a further harmonic of the interference signal falls within the first range of frequencies, the further harmonic being different to the harmonic within the second range of frequencies.

According to a further embodiment the harmonic within the second range of frequencies. is the fundamental frequency of the interference signal and the further harmonic is a higher harmonic of the interference signal. A higher harmonic means a harmonic that is higher in frequency than the fundamental frequency (higher than the first harmonic). This is advantageous as the fundamental frequency is likely to have the strongest signal.

According to a further embodiment the higher harmonic is a second harmonic of the interference signal.

According to a further embodiment the fundamental frequency is 1090 MHz and the second harmonic is 2180 MHz. 1090 MHz is the fundamental frequency of the signals produced by an Air Traffic Control Radio Beacon System (ATCRBS)/Mode-S transponder which have a second harmonic of 2180 MHz that falls within the S-band Mobile Satellite Service (MSS) frequency allocation (2170-2200 MHz) for the Complementary Ground Component (CGC) service. Accordingly, arranging the system for use with these frequencies allows the system to be adapted to cancel interference in air to ground communication.

According to a further embodiment the system is a wireless communication system for use on an aircraft and the interference signal is an air traffic control emission. Such systems are particularly susceptible to interference due to the strength and regularity of air traffic control emissions.

According to a further embodiment the system is a wireless communication system employing the long term evolution (LTE) communication standard. LTE communication is tolerant of short gaps in transmission, particularly for the duration of short ATC pulses. Such systems are therefore more able to adapt to pulse blanking than other systems.

According to a further embodiment the blanking module comprises a switch and the blanking module is configured to isolate the output from the input using the switch.

According to a further embodiment the receiver circuitry comprises signal processing circuitry and the blanking module is located between the input and the signal processing circuitry. The signal processing circuitry may comprise a downconverter, a filter and/or a demodulator, among other processing components.

According to a further embodiment the receiver circuitry comprises signal processing circuitry; the signal processing circuitry is located between the input and the blanking module; and the signal processing circuitry comprises time delay circuitry connected to the blanking module and configured to compensate for any difference in signal delay between in the receiver circuitry and the interference detection module. The interference detection module can also include signal processing circuitry.

According to an embodiment there is provided a method for mitigating interference from an interference signal, the method comprising: receiving, at an input, an input signal from an antenna; processing the input signal to form an output signal at an output, the processing comprising filtering the input signal to pass a first range of frequencies for output; analysing the input signal over a second range of frequencies, different to the first range of frequencies, to detect when the interference signal has been received by the antenna; wherein the processing comprises isolating the output from the input to blank the output signal when the inference signal is detected.

BRIEF DESCRIPTION OF THE DRAWINGS

Arrangements of the present invention will be understood and appreciated more fully from the following detailed description, made by way of example only and taken in conjunction with drawings in which.

DETAILED DESCRIPTION

Interference Blanking

The embodiments described herein pertain to methods aimed at minimising the impact on the performance of a radio receiver system of non-predictable pulsed interference emissions in the same frequency band from co-sited radio systems.

A specific example that encounters problems with co-sited pulsed interferers is an air-to-ground (ATG) downlink. That is, transmissions from a base-station to an aircraft terminal. An ATG communications link may be based on the 3GPP Long Term Evolution (LTE) standard operating as part of a Complementary Ground Component (CGC) service within the S-band Mobile Satellite Service (MSS) frequency allocation (2170-2200 MHz receive). This can be affected by pulsed interference resulting from the second harmonic of the aircraft's high-power Air Traffic Control Radio Beacon System (ATCRBS)/Mode-S transponder (2180 MHz).

It should be noted that, the abbreviation ATC is used herein to relate to both an air traffic control radar beacon system (ATCRBS—typically mode-A/C) and/or Mode-S operation, including use as part of the Traffic Collision Avoidance System (TCAS).

As discussed above, issues with pulsed interferers can be found in ATG wireless transmissions operating in the 2170-2200 MHz MSS (receive) band. These problems can be caused by the aircraft's air traffic control (ATC) transponder. Whilst ATC transponders have nominal emissions at 1090 MHz, the second harmonic of these transmissions lies within the ATG receive band at 2180 MHz.

Figure 1:
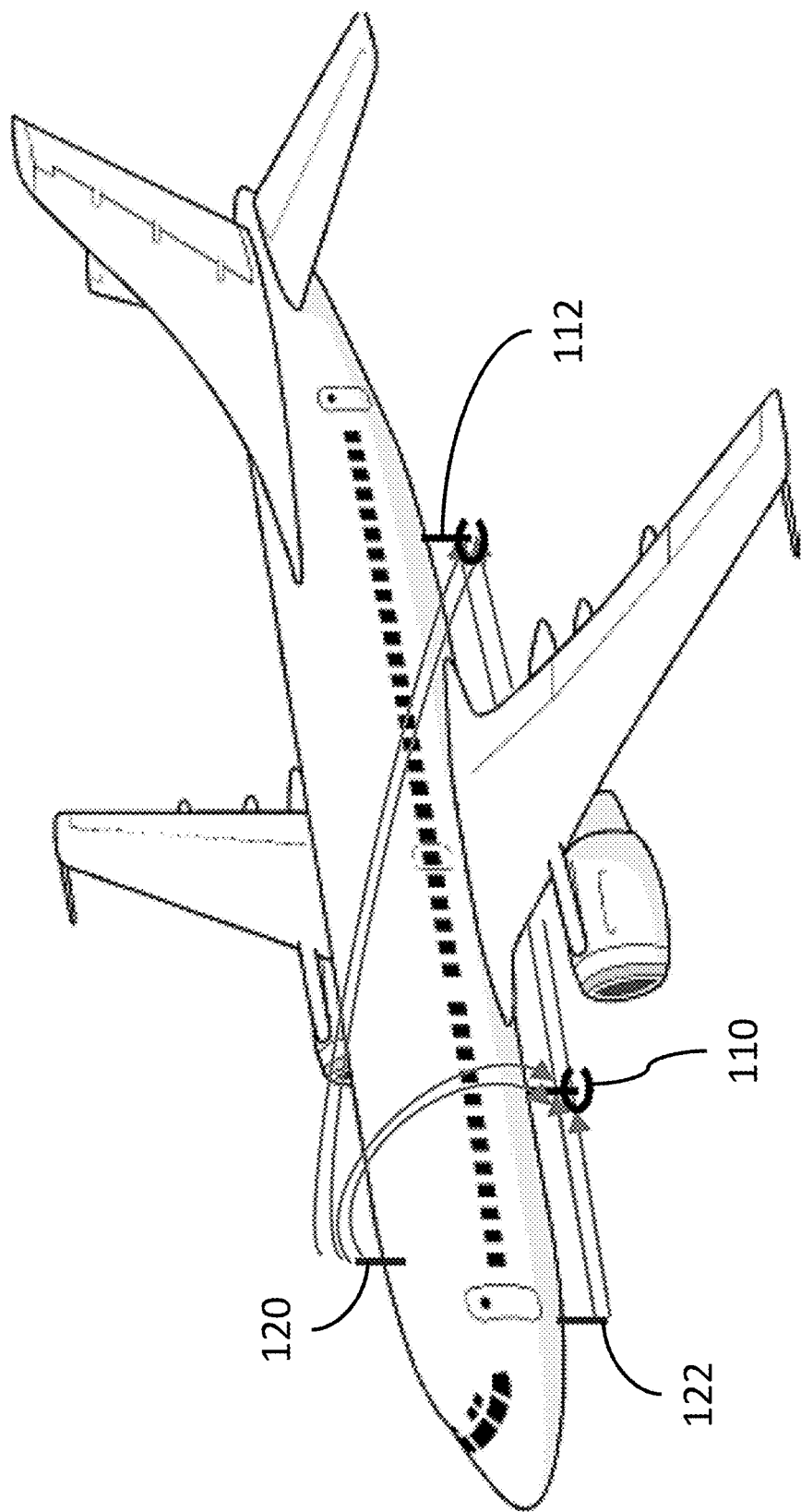
FIG. 1 shows an example of coupling paths between air traffic control transponder antennas and air to ground antenna arrays on a commercial aircraft.

FIG. 1 shows an example of coupling paths between air traffic control (ATC) transponder antennas and air to ground (ATG) antenna arrays on a commercial aircraft. The aircraft comprises two ATG antennas 110, 112 for wirelessly communicating with base-stations on the ground. The ATG antennas 110 are located on the underbelly of the aircraft. A first ATG antenna 110 is located towards the front of the aircraft and a second ATG antenna 112 is located towards the rear.

The aircraft further comprises two ATC transponder antennas 120, 122 for transmitting to air traffic control systems. A first ATC transponder 122 is located on the underbelly of the aircraft and a second ATC transponder 120 is located on the top of the aircraft. Coupling paths are formed between each of the ATC transponders 120, 122 and each of the ATG antennas 110, 112.

For a Class 1 ATC transponder (i.e. for aircraft operating at altitudes above 15000 ft, or at a maximum cruising true airspeed>324 km/h), the minimum ATC transmit power is 125 W (51 dBm) and maximum transmit power is 500 W (+57 dBm).

The minimum RF attenuation at the 2nd harmonic frequency (2180 MHz) is specified to be at least 50 dB for Mode A/C transponders, and 60 dB for Mode-S transponders.

Assuming a minimum separation between ATC and ATG antennas of 2 m, the free space path loss at 2180 MHz is approximately 39 dB. Thus, for 0 dBi nominal antenna gains, the received power of the ATC Mode-S second harmonic at the ATG antenna port may be as high as −42 dBm. By contrast, the reference sensitivity of an LTE waveform is typically much lower (in the region of −90 to −100 dBm).

Thus, without mitigation, the high peak power and potentially high repetition rate of the ATC transponder interference under typical ATC interrogation scenarios (interrogation rate, ATC mode mixture, etc.) can result in severe degradation of the radio receiver performance (e.g. increased error rate, reduced throughput, etc.).

A first embodiment of the present method in wireless communications involves the improvement of data throughput in a broadband Air To Ground (ATG) communications link, where the link between the ground station and aircraft is affected by pulsed interference emissions generated by other avionics systems on the same aircraft or from ground stations. In a more specific example, the pulsed interference emissions are harmonics of the nominal emission frequencies of the other aviation systems caused by nonlinear elements in the relevant transmission chain (including antenna).

Conventional suppression systems suppress entire emission 'bursts' of pulses, where individual bursts may comprise a sequence of shorter on/off pulses. ATC emissions are examples of bursts of on/off pulses. Digital radio receivers utilising Forward Error Correction (FEC) codes are typically better able to accommodate a short loss of input signal than a longer one.

In light of the above, embodiments of the invention only blank for each 'on' pulse in the burst rather than the whole burst (the whole sequence of on/off pulses). This offers significant improvement in data throughput.

In a first implementation, which is generally applicable to any in-band pulsed interferer, the impact of the interferer on ATG receiver performance is reduced by only blanking the 'on' pulses of the burst of pulses. Blanking during the interferer bursts improves performance by preventing the receiver from entering saturation—which could result in slow recovery times. Furthermore, the LTE protocols are relatively tolerant to signal interruptions (blanking) equal to ATC pulse durations. This is in part due to coding gain and hybrid automatic repeat request (HARQ) processing. Having said this, large interference pulses affect LTE significantly due to the effect of signal peaks on the modulation and coding scheme. Accordingly, individual pulse blanking is suited to application in LTE communication for mitigating ATC pulses.

Further embodiments described herein improve the blanking of pulsed interference from a higher harmonic of a pulsed signal (e.g. from the $2^{nd}$ harmonic of an ATC transponder signal) by detecting the pulses based on the fundamental frequency signal. A practical blanking scheme can be implemented with only a modest increase in complexity to the system.

Figure 2:
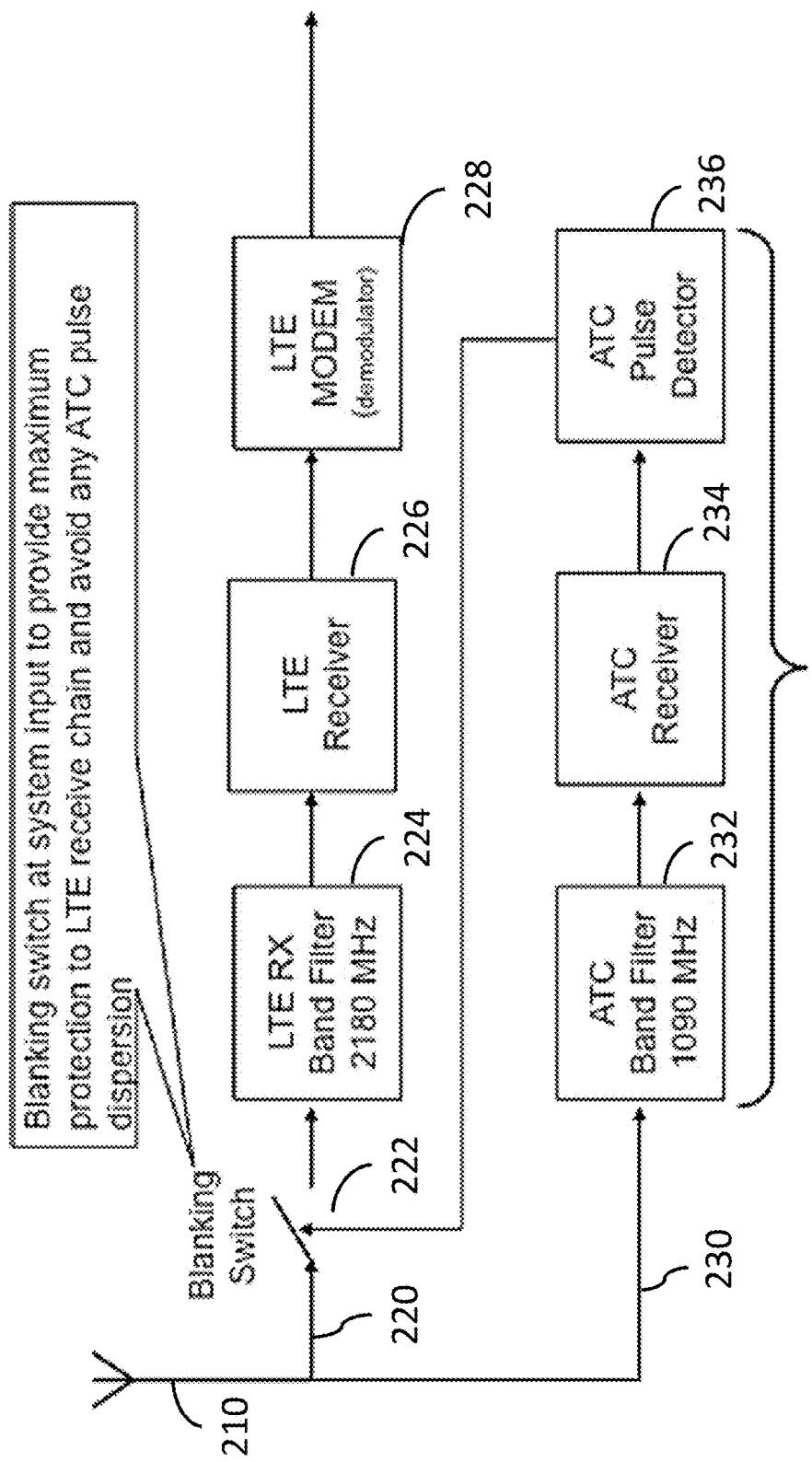
FIG. 2 shows a pulse blanking system according to an embodiment.

FIG. 2 shows a pulse blanking system according to an embodiment.

An antenna 210 is connected to a receive line 220 and a pulse detection line 230. In the figure, for simplicity, these two lines are shown connected in parallel, however, in practice, a low noise amplifier followed by a power splitter may be used in order to avoid impedance mismatch and compensate for splitting losses.

The receive line 220 comprises a blanking switch 222, a band pass filter 224, a receiver 226 and a modem 228. The blanking switch 222 is an on/off switch that is controlled by the output of the pulse detection line 230. This allows the receive line 220 to be blanked during pulsed interference. When the receive line 220 is blanked the blanking switch 220 is opened to isolate the antenna 210 from the band filter 224. Locating the blanking switch 222 at the input of the receive line 220 protects the receive line and avoids any dispersion of the pulsed interference through the system.

The band pass filter 224 filters out high and low frequency signals so that only signals within the required frequency band for the communication channel are allowed through the filter. In the present embodiment the band pass filter 224 is an LTE receive (RX) band pass filter including 2180 MHz. More precisely, the band pass filter has a passband of between 2170 MHz and 2185 MHz, corresponding to a single spectral allocation in the MSS band. Having said this, alternative communication schemes to LTE may be utilised and alternative frequencies may be filtered.

The receiver 226 comprises signal processing circuitry forming part of the receive chain. This includes a downconverter to convert the received signal from the carrier frequency to a lower frequency; this can either be at a low intermediate frequency or baseband. In the present embodiment, the receiver 226 is an LTE receiver. Accordingly, the receiver 226 may be configured to convert a signal received at a carrier frequency in the region of 2170-2185 MHz to baseband. Having said this, the receiver 226 may operate according to an alternative communication scheme.

The modem 228 is configured to modulate and demodulate signals in addition to acquiring and tracking signals. In the present embodiment, the modem 228 refers to the receive part of such a modem. Accordingly modem 228 is configured to filter and demodulate the baseband signal converted by the receiver 226. In the present case, the modem 228 is an LTE modem configured to work with LTE signals. Having said this, the modem 228 may operate according to an alternative communication scheme.

The modem 228 is configured to output demodulated data via an output.

The pulse detection line 230 comprises an interference band pass filter 232, an interference receiver 234 and an interference pulse detector 236. As the present embodiment relates to the detection of pulsed interference from air traffic control (ATC) signals, these components in the present embodiment are an ATC band pass filter, an ATC receiver and an ATC pulse detector, although the method described herein may be applied to any form of pulsed interference.

The band filter 232 is configured to filter out high and low frequencies, only allowing through frequencies within a frequency range. In the present case, interference is expected from the second harmonic of the ATC signal. Having said this, the signals of the second harmonic will be smaller, and therefore harder to detect, than the frequencies of the first harmonic. Accordingly, the band pass filter 232 has a pass band that allows through the first harmonic of the ATC signal. In this case, the first harmonic of the ATC signal is expected at 1090 MHz. Accordingly, the ATC band pass filter 232 has a passband centred on 1090 MHz to facilitate the detection of the fundamental interference signal. In the present embodiment the pass-band is consistent with that used in an ATC receiver. The signal is cantered on 1090 MHz and the 3 dB ATC bandwidth is in the range 1.3 to 7 MHz.

The receiver 234 comprises a downconverter configured to convert the filtered signal from the band filter 232 to a baseband signal at the baseband frequency. In the present embodiment the receiver 234 is an ATC receiver configured to convert the first harmonic ATC signals (around 1090 MHz) to the baseband frequency.

The pulse detector 236 is configured to detect pulses within the frequency range. This is based on a threshold applied to signal envelope strength and/or power of the interference signal. When the interference signal exceeds the threshold, the detector 236 outputs a signal indicating that a pulse has been detected. When the interference signal does not exceed the threshold, the detector 236 outputs a signal indicating that a pulse is not detected. This decision may be achieved via a comparator. The signals output by the detector 236 control the blanking switch 222 to blank the receive line 220 for the duration of each detected pulse.

A delay line may be incorporated into the system receive line to compensate for processing and transmission delays within the pulse detection line and thereby ensure optimum pulse blanking. For reasons of clarity, the equalisation of delays has not been included in FIG. 2.

In the embodiment of FIG. 2, the blanking switch 222 is located ahead of the band filter 224, receiver 226 and modem 228. By putting the blanking switch 222 at the input maximum protection is provided to the receive chain. Furthermore, this avoids dispersion of the ATC pulse through the receive chain circuitry.

In an alternative embodiment, the blanking switch 222 is located after the receiver 226 but before the modem 228. In this case, any delay across the receive chain can be mitigated by reducing the previously mentioned added delay in the receive line. This can help provide improved blanking.

By only blanking on detected pulses, rather than across the entirety of the period of the pulse-train, throughput is improved. Whereas LTE terminals can be severely disrupted by ATC pulse interference, the LTE protocols themselves are relatively tolerant to signal interruptions (blanking) equal to ATC pulse durations.

Where a system includes multiple antennas (e.g. on an aircraft that utilises multiple ATG antennas for spatial diversity) pulse blanking can be applied to each antenna.

Figure 3:
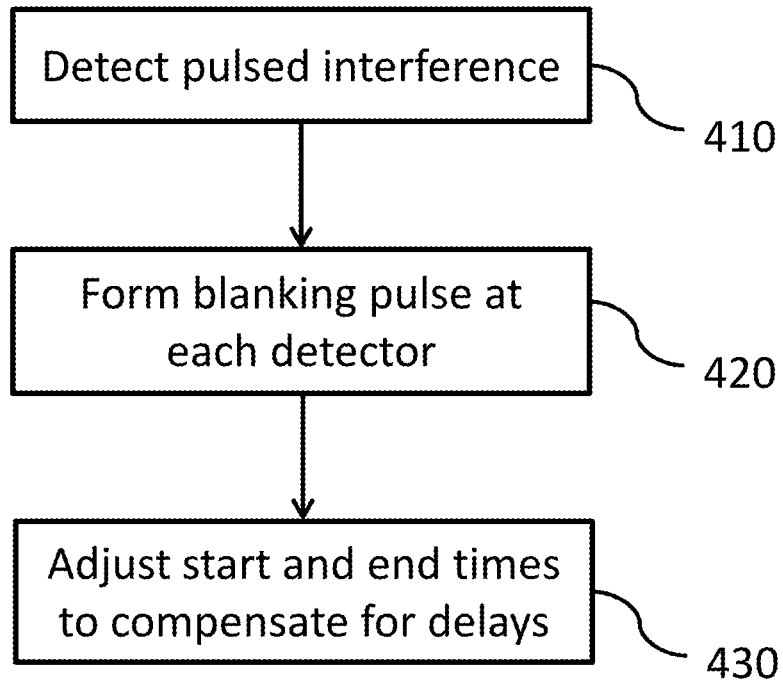
FIG. 3 shows a method flow chart for the generation of the pulses used to blank pulsed interference according to an embodiment.

FIG. 3 shows a method flow chart for the generation of the pulses used to blank the pulsed interference.

The presence of the pulsed interferer on/off pulses is first detected 410. In the embodiment of FIG. 1, these would be detected in the receive circuitry for each ATG antenna port. A pulse may be detected each time the received signal exceeds a predetermined threshold. The predetermined threshold may be based on an average signal level or peak signal level. For instance, the threshold may be a fraction of the peak interference (e.g. half of the peak ATC signal). The peak interference can be determined during calibration of the system.

Next, a blanking pulse is formed 420. This is generated based on the detected interference at the respective antenna.

Adjustments may be made at this stage to adjust the start and end timing of the pulse detections 430. This can compensate for any internal path latencies and differences in the propagation delay between the different antennas.

Although the embodiments are described herein in terms of their application in wireless communications, it will be apparent to a person skilled in the art that the same techniques are equally applicable to other applications, such as radar and sensor systems. Equally, the methods are applicable in other (i.e. non-radio) frequency ranges.

Whilst blanking can be effective at mitigating interference, alternative embodiments make use of cancellation to mitigate interference to further reduce performance degradation.

Interference Cancellation

According to an embodiment, which is generally applicable to any in-band interferer, particularly where the received interferer amplitude and relative phase variations are modest, use is made of the difference in the level of the interferer at multiple antennas at different locations to effect interferer cancellation to significantly improve performance beyond that which can be achieved with blanking alone or cancellation using a single composite signal at a single frequency. Where the received interferer signal used to form the interferer cancellation signal also contains the wanted signal, incomplete cancellation can occur and thus an improvement for the cancellation of pulsed interference is that cancellation may only be applied during interferer pulses, using a similar pulse detection system as discussed above.

The methods described herein are generally applicable to any wireless communication system. Nevertheless, the following embodiments shall describe the system in the context of its use within an air to ground (ATG) communication system.

As discussed with regard to FIG. 1, aircrafts often utilise multiple, spatially separated ATG antennas and multiple, spatially separated ATC antennas. FIG. 1 shows the interference propagation paths between aircraft ATC transponders, alternately emitting from upper and lower ATC antennas, to an ATG system having two spatially separated antennas on the underside of the aircraft. The ATG and ATC systems each have two antennas to provide spatial diversity—for mitigation against shadowing (path blockage) caused by the aircraft fuselage and/or engines for certain aircraft orientations with respect to ATG ground stations. The ATG system may be a Multiple Input Multiple Output (MIMO) LTE based Complementary Ground Component (CGC) communication system. Such a dual-polarisation MIMO scheme can achieve higher total bit throughputs than the equivalent Single Input Single Output (SISO) scheme employing a single polarisation; nevertheless, the mitigation method described herein is equally applicable to a SISO system.

To simplify the explanation of this specific embodiment, only interferer emissions emanating from the lower ATC antenna are considered initially. Accordingly, the interferer emissions derive from an ATC antenna on the same (under) side of the aircraft as the ATG antennas. Subsequently, a refinement will be described to accommodate mitigation of emissions from both ATC antennas, if this is merited by the received power from the upper ATC antenna, which is shielded by the fuselage.

The antenna array sitings result in different ATC interferer received powers at each ATG antenna, as a consequence of their different spacing from the lower ATC antenna, while the ATG signal power (which originates from much further away) is nominally the same at each array—except when one array is shadowed by the airframe.

In the example embodiment, Radio Frequency (RF) signals from each antenna array are connected to a transceiver (or Remote Radio Head (RRH)) via short coaxial cables to minimise losses.

Figure 4:
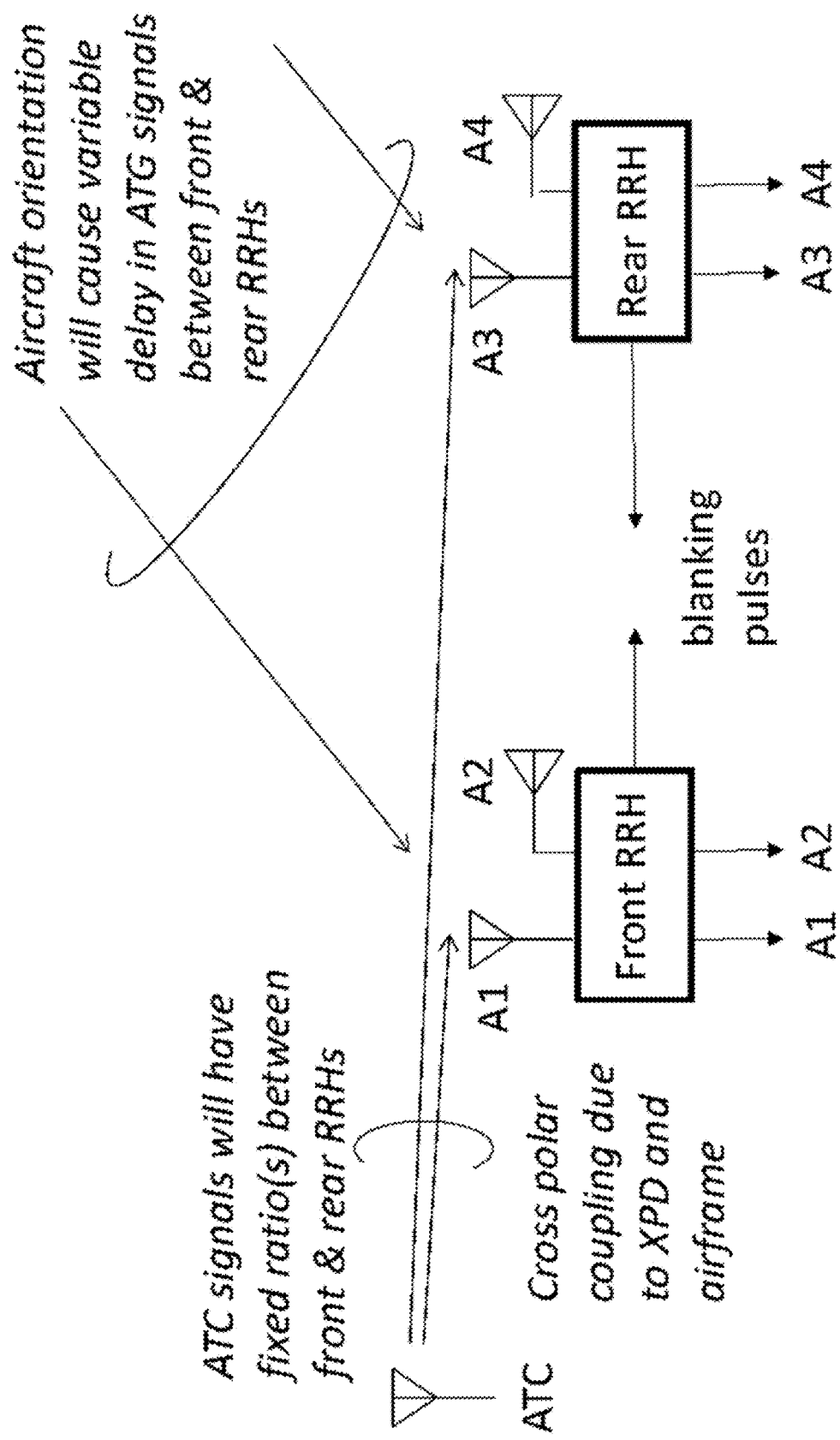
FIG. 4 shows the Air Traffic Control (ATC) interference and Air-To-Ground (ATG) signal coupling for the underside of the aircraft of FIG. 1.

FIG. 4 shows the ATC interference and ATG signal coupling for the underside of the aircraft of FIG. 1.

Two ATG remote radio heads (RRHs) are located on the underside of the aircraft. Each RRH is a transceiver that is connected to a respective set of ATG antenna elements. A front RRH has two antenna elements A1, A2 and a rear RRH also has two antenna elements A3, A4. The antenna element polarisations in each pair are orthogonal to each other. The front RRH is located closer to the ATC antenna than the rear RRH.

It can be seen that the received ATC interferer power at each antenna array/RRH is different but their amplitude ratio and phase difference are essentially constant, being predetermined by the airframe geometry and antenna siting. The same may also be true for each individual antenna element in MIMO antennas, after accounting for any polarisation losses for the case of the dual-polarised arrays. However, the ATG powers are essentially the same at each array, but the ATG signals will experience differing delays, depending on the relative direction (azimuth and elevation) of the serving ground station.

The example embodiment of the invention employs interference cancellation at the antenna array/RRH furthest away from the interferer source (e.g. rear RRH) by means of the subtraction of a replica interference signal(s) derived from the antenna array/RRH closest to the interferer (e.g. front RRH), which has a greater interferer power. This replica interferer signal is derived by scaling and time/phase shifting and thus this method relies on the difference in interferer power between antennas being reasonably large so as to reduce the residual ATC signal sufficiently to be insignificant after subtraction, without also causing a substantial reduction in the desired ATG signal due to the residual ATG signal contained in the replica interferer signal.

This embodiment is described with reference to the antenna arrangement shown in FIG. 1. The plane has two ATG antennas 110. A first antenna (antenna 1) is located closer to the ATC antenna than a second antenna (antenna 2). Whilst FIG. 1 has multiple ATC antennas, FIG. 4 shows a single ATC antenna for simplicity. In the present embodiment this relates to the first ATC antenna 122 located on the underside of the plane in FIG. 1. It will be appreciated that a similar coupling arrangement will be established between the second ATC antenna 120 (located on the roof of the aircraft, above the first ATC antenna 122) and the two ATG antennas.

Antenna 1 will detect a signal (S1) which is made up of two components. A first component represents signals from the ATC antenna (ATC1) and a second component represents LTE air to ground (ATG) communication signals from a base station (LTE1):

$$S1 = ATC1 + LTE1$$

where ATC1 and LTE1 represent the complex amplitudes of the respective signal components.

Similarly, antenna 2 will detect signal (S2) comprising a first component associated with air traffic control (ATC2) and a second component representing LTE air to ground communication signals (LTE2):

$$S2 = ATC2 + LTE2$$

where ATC2 and LTE2 represent the complex amplitudes of the respective signal components.

Given that the distance between antenna 1 and antenna 2 will be minimal compared to the distance to the serving base station, the LTE signals from each antenna will be approximately the same (LTE=LTE1~LTE2).

Having said this, the ATC signal at antenna 1 will be much greater than the ATC signal at antenna 2, as it is proportionally much closer to the ATC antennas than antenna 2. That is, $ATC2 = \alpha \cdot ATC1$ where $\alpha$ is a ratio with $\alpha \ll 1$.

Accordingly, in order to cancel out the ATC2 signal in S2, the signal from antenna 1 (S1) is scaled by $\alpha$ before being subtracted from S2. Given that $\alpha \ll 1$ then, after subtraction of S1 at antenna 2, the amplitude of the ATG signal at antenna 1 is:

$$S2 - \alpha \cdot S1 \approx LTE1$$

Since the exact value of the ratio $\alpha$ of ATC2/ATC1 is not known, an estimate, $\beta$, is used. After subtraction, this leads to:

$$S2 - \beta \cdot S1 = (1-\beta) \cdot LTE1 + (\alpha - \beta) \cdot ATC1$$

which comprises a slightly reduced LTE signal and a small residual ATC signal. Nevertheless, the residual signal will be significantly smaller than the interference associated with ATC2 vs LTE prior to cancellation.

A first estimate for the magnitude of the ATC ratio, a, is given by:

$$|\alpha| \approx |\beta| = \sqrt{P2/P1}$$

where P1 & P2 are the pulsed emitter powers (e.g. peak or average) corresponding to amplitudes ATC1 and ATC2.

This suggests, for good cancellation, $\alpha < 0.1$ and $P2/P1 < 0.01$.

In a non-dynamic case, $\alpha$ is constant and may be predefined (for instance, measured on installation). In a dynamic case, a may need to be varied dynamically to track the amplitude and phase of the ATC signal.

If the LTE signal is comparable to or greater than the ATC signal, the inequality discussed above would no longer apply so the application of the cancellation discussed above could degrade performance; however, in this case, the interference from the ATC2 signal may be adequately compensated for via the LTE protocol (or whatever alternative communication protocol is being utilised). In one embodiment, a threshold is applied to ensure that cancellation is only applied when the ratio between the LTE signal and ATC2 is less than a set level.

In a further embodiment, cancellation is only applied during an ATC pulse. This can be controlled using the ATC pulse detection mechanisms discussed herein.

In a system with dual polarized antennas (for instance, the system shown in FIG. 4), each RRH will output two signals, one relating to each antenna element. Signals from antenna elements with the same polarization can be combined as discussed above (via scaling and cancellation) to cancel out the pulsed interference in each element.

In an alternative embodiment, signals from the same antenna, but from different antenna elements with different polarizations may be used for cancellation. For instance, the ATC signal may be much weaker in one polarisation. Accordingly, the signal from the antenna element with the larger ATC to ATG ratio could be scaled and subtracted from the signal from the antenna element with the lower ATC to ATG ratio. This allows the methods described herein to be implemented in a single antenna system.

Figure 5:
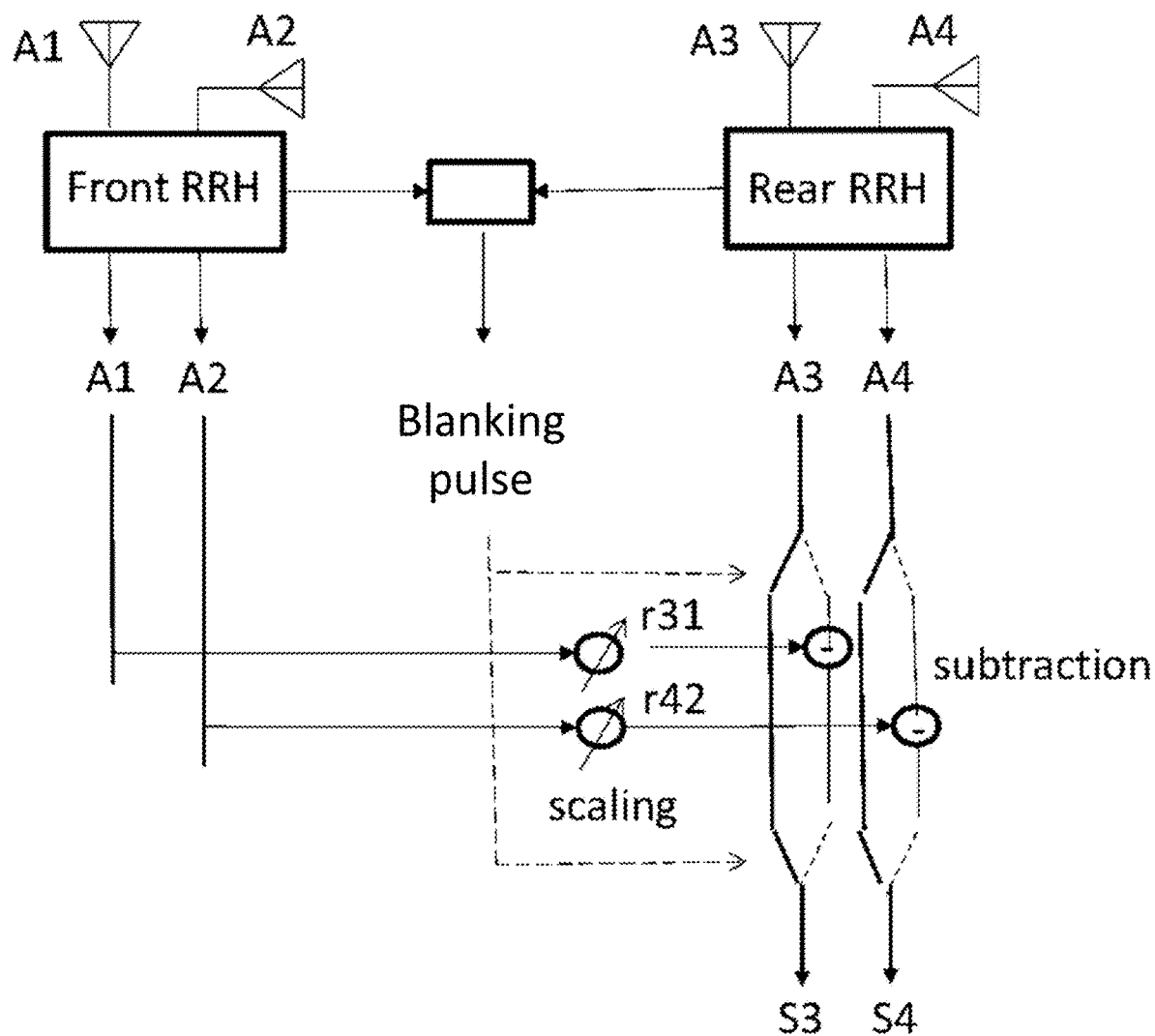
FIG. 5 shows a system for cancelling pulsed interference via scaling and subtraction according to an embodiment.

FIG. 5 shows a system for cancelling pulsed interference via scaling and subtraction according to an embodiment.

The system of FIG. 5 has the same antenna arrangement as that of FIG. 4. The front RRH is connected to antenna elements A1 and A2. The rear RRH is connected to antenna elements A3 and A4. The Antenna elements A1 and A3 have the same polarization as each other. Antenna elements A2 and A4 share the same polarization but are orthogonal to antenna elements A1 and A3.

As antenna elements A1 and A2 are located closer to the ATC antenna than antenna elements A3 and A4, signals from A1 and A2 will have a larger ATC component. The signal(s) from one or both of A1 and A2 may therefore be used to cancel out ATC interference in the signals from A3 and A4.

In one embodiment, the cancellation is between antenna elements having the same polarisation. For instance, the signal from A1 applied to A3 and the signal from A2 applied to A4. In an alternative embodiment, the cancellation signal for both A3 and A4 is derived from the antenna element (A1 or A2) having the strongest ATC signal. Accordingly, the signal from the antenna element that has the strongest interference component may be used to generate replica interference signals for each of the antenna elements in the other RRH (A3 and A4).

As discussed above, some embodiments only apply the cancellation during interference pulses. Accordingly, the cancellation is controlled based on blanking pulses produced by one or other of the RRH. In the present embodiment, a composite blanking pulse is formed based on the blanking pulses from each RRH. Having said this, other configurations are possible which may generate blanking pulses from just one RRH (e.g. the one nearest to the ATC) with no combination.

When no pulse is detected, the outputs of A3 and A4 bypass the cancellation. When a pulse is detected, the (composite) blanking pulse triggers cancellation.

During cancellation, the signal from A1 is scaled using a first scaling factor and subtracted from the signal from A3. Equally, the signal from A2 is scaled using a second scaling factor and subtracted from A4. The choice of which antenna to derive the scaled cancellation signal can vary depending on set-up and signal strength. Accordingly, both cancellation signals may be derived from A1 or A2, with respective scaling factors being applied for cancellation for A3 and A4.

Respective delays/phase shifts are applied to the signals from A1 and A2 to bring the cancellation signals into phase with the respective signals from A3 and A4 before subtraction. A person skilled in the art will recognise that signal subtraction is equivalent to signal addition with anti-phase signals (signals with a relative phase-shift of 180°).

As noted previously, the effectiveness of cancellation is dependent on accurate estimation and tracking of the interferer RF amplitude and phase. A significant advantage of systems with antennas mounted on nominally rigid mobile platforms such as aircraft is the relative stability of antenna coupling loss amplitude ratio and delay/relative phase. This potentially leads to significant simplification of the estimation/measurement and control of replica scaling.

On an aircraft, only minor (secondary) perturbations of the coupling ratios (magnitude & phase) are expected to result from thermal expansion, atmospheric refractivity changes and changes in airframe configuration and attitude (flaps, wing bending, etc.) when the antennas are located on the main fuselage.

Should continuous estimation of scaling be needed, an estimate of the scaling magnitude may be derived from the ratio of the average received signal power at each antenna measured during the interferer pulses. That is, the scaling factor α at time t may be estimated via $$|\alpha(t)| \cong \sqrt{P2(t)/P1(t)}$$

where P1(t) is the average received signal power at time t during interferer pulses at the antenna with the strongest pulsed interference and P2(t) is the average received signal power at time t during interferer pulses at the antenna with weaker pulsed interference. This estimate may be refreshed periodically. A respective scaling factor may be determined for each combination of antennas or antenna elements involved in cancellation.

More sophisticated estimation schemes would, of course, be needed if there is significant variation in α, for example, should the antenna arrays not be collocated on a rigid platform.

Furthermore, in situations where the interference is pulsed but repetitive, standard filtering techniques of the scaling factors can be used to further reduce estimation errors due to noise.

The effectiveness of cancellation is dependent on accurate estimation and tracking of both interferer RF amplitude and phase. For example, the interferer phase at two physically separated antennas will be affected by thermal expansion, atmospheric refractivity changes and flexure under stress of the airframe (and/or cables). It will be appreciated that such parameter estimation may be readily achieved using statistical signal processing, such as feedback control loops or predictor-corrector estimator methods (e.g. Kalman filtering), depending on the observed parameter variability and measurement noise. Since the interference source is pulsed and intermittent but results from a constant, coherent carrier, the necessary estimator gating may be provided by using the blanking pulses generated in the embodiments described herein.

For most co-sited pulsed interferers, amplitude variations may be expected to be less significant than variations in phase, and hence it may be acceptable to estimate amplitude only once (e.g. at initial calibration), with an estimate of the amplitude scaling magnitude derived from the ratio of the average received composite signal power at each antenna measured during the interferer pulses.

A further refinement facilitates the pulsed cancellation of interference signals which emanate from more than one location, such as ATC bursts emanating alternately from the upper and lower ATC antennas. In such situations, the interferer power ratios at the upper and lower antenna array/RRHs may differ depending on the ATC antenna from which the burst emanated. Should the interference be significant for both emitter locations, it will then be desirable to first detect which emitter antenna was used and apply the appropriate ratio (scaling and delay) to achieve optimum cancellation. For the case of the ATC interference scenario illustrated in FIG. 1, it is anticipated that a simple two threshold pulse detector could be employed for this purpose, since the received power from the upper ATC antennas will be significantly less than that for the lower ATC antenna, as a result of shadowing by the aircraft fuselage.

Accordingly, when the signal exceeds a predefined threshold, a first scaling factor and first phase shift (or first set of scaling factors and phase shifts where multiple sets of antenna elements are used) may be chosen. When the signal does not exceed the predefined threshold then a second scaling factor and second phase shift, (or second set of scaling factors and phase shifts), may be used. The predefined threshold may, for instance, be the mid-point in power between the first and second ATC signals (i.e. the average of the first and second ATC signals). Alternatively, the threshold may be defined logarithmically relative to the first and second ATC signals. This could be determined upon calibration (e.g. at installation) or could be updated periodically.

Unmodified, the proposed interference cancellation at the rear antenna of a two antenna system has the limitation that, in the event that the primary antenna array/RRH (in this case, the read RRH) is shadowed, cancellation fails and no mitigation is available for a system based on spatial diversity. Accordingly, a hybrid mitigation scheme is proposed.

Figure 6:
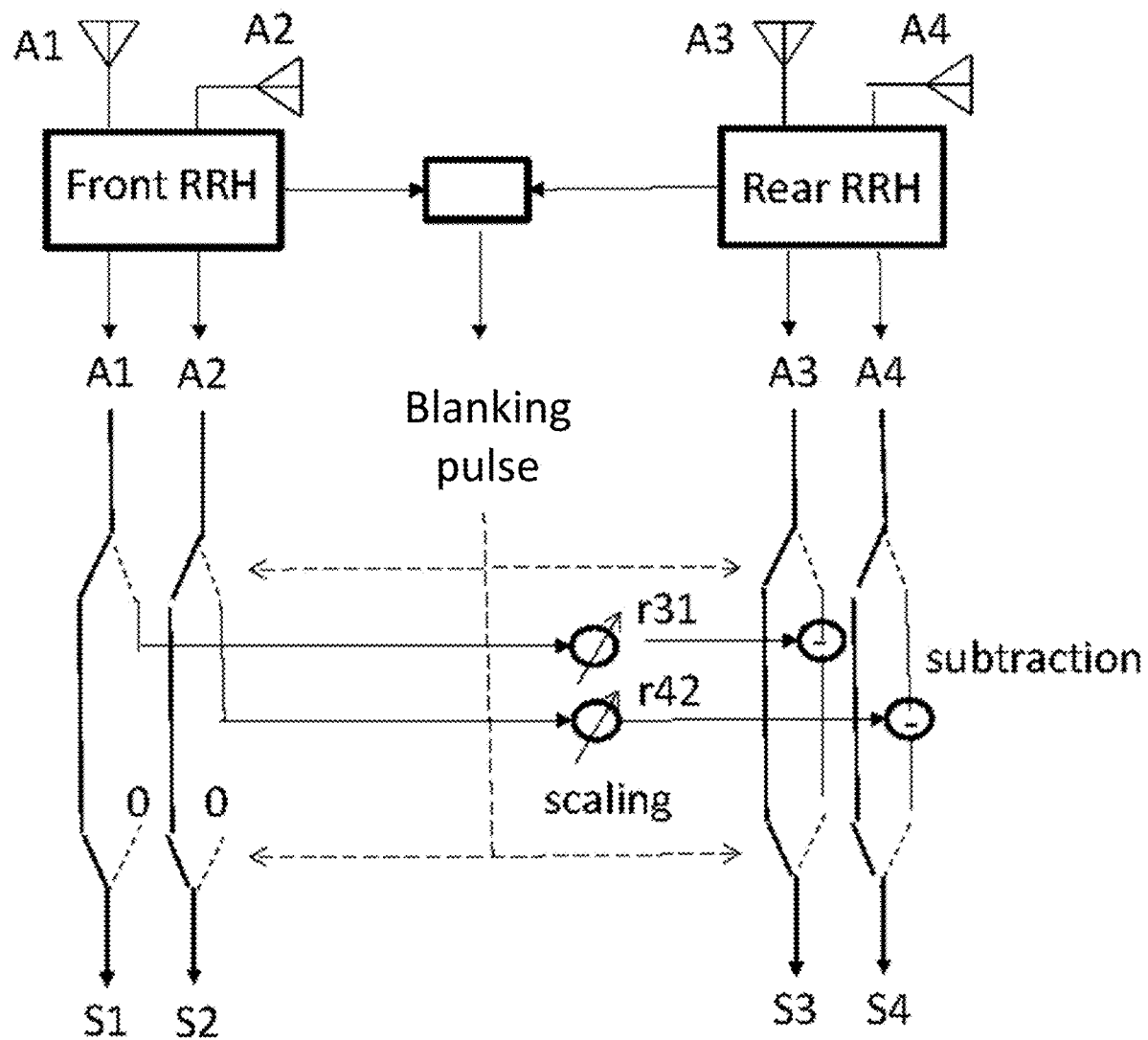
FIG. 6 shows a hybrid mitigation scheme employing pulse blanking and pulse cancellation according to an embodiment.

FIG. 6 shows a hybrid mitigation scheme employing pulse blanking and pulse cancellation according to an embodiment. This method employs pulse blanking as described earlier on the front antenna array/RRH and pulse cancellation on the rear antenna array/RRH so that a mitigated signal is maintained whenever and whichever antennas are shadowed. The same blanking pulses are used to trigger both events.

As discussed previously, pulse blanking disconnects the output of each antenna element for the duration of the interference pulse. This sets the output of each antenna element to essentially zero for the duration of the pulse. In between pulses, the outputs are reconnected to enable a signal from each antenna element to be output. In this case, pulse blanking is applied to the received signals from the front antenna elements (A1 and A2) and cancellation is applied to the rear antenna elements (A3 and A4) (albeit, using cancellation signal(s) derived from A1 and/or A2). It should be noted that the cancellation, when applied to A3 and A4, does not make use of the blanked output of A1 and A2 in order to derive the cancellation signals for use with A3 and A4. Instead, the cancellation signal(s) is/are derived from the detected signal, pre-blanking.

The system may therefore select between the cancelled signal from antennas A3 and A4 or the blanked signals of A1 and A2 depending on the strength of the ATG (LTE) component of the respective signals. This selection can be made based on the wanted signal and noise (including interferer signal) characteristics. Conventional diversity combining can be used to select and/or combine the best output signals from the front (blanked) and back (cancelled) arrays.

Antenna/array selection might be based on, for example, signal to noise plus interferer ratio (SINR or SNIR) or on a performance metric such as CQI (channel quality indicator).

For instance, when A3 and A4 are shadowed, the system can switch to the pulse blanked signals from A1 and A2 to make use of spatial diversity. If antennas A1 and A2 are shadowed then the system can still operate effectively based on cancelled signals from A3 and A4, as only the ATC components of the signals from A1 and A2 are needed during cancellation.

In a further embodiment where the interferer signal at the front antenna element A1 is significantly stronger than in element A2, cancellation may also be used at element A2 of the front antenna. The system may therefore select between the cancelled signal from antennas A3 and A4 or the blanked signal of A1 and cancelled signal of A2, depending on the strength of the ATG (LTE) component of the respective signals.

Harmonic Pulsed Interference Cancellation with Multiple Antennae

In a further embodiment, which is generally applicable to situations where the in-band interferer results from harmonic emissions of another aviation system, the fundamental interferer emission is detected at one of the antennas and a replica of the interferer harmonic is generated from the fundamental. This is used for cancellation of the harmonic interferer in the received signal. This embodiment may be utilised in a multi-antenna system, or in a single antenna system, as discussed below.

Figure 7:
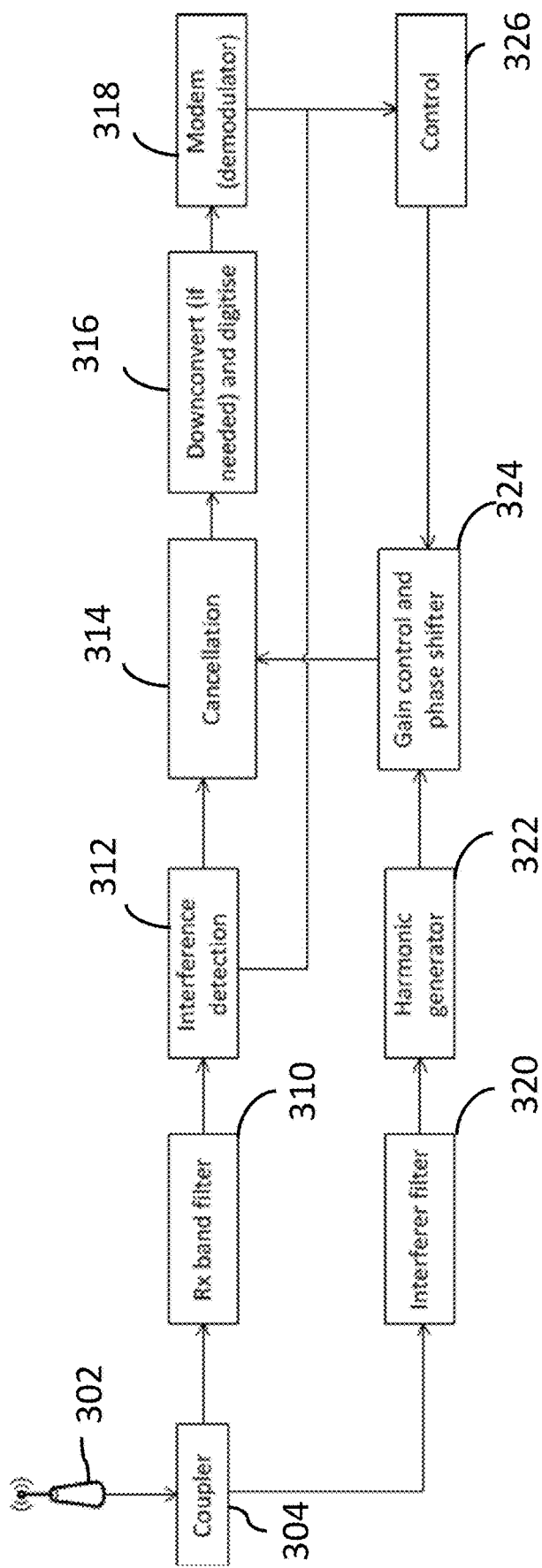
FIG. 7 shows a system for cancelling interference using a cancellation signal generated based on the fundamental of the interference emissions according to an embodiment.

FIG. 7 shows a system for cancelling interference using a cancellation signal generated based on the fundamental of the interference emissions according to an embodiment.

Cancellation occurs in a similar fashion to the example for multi-antenna cancellation method described above, except in this case the interferer is a harmonic of an emission whose fundamental is detectable. The fundamental signal is then used to form a replica of the harmonic interferer derived by means of a non-linear circuit/function. The advantages of this approach are that the detected interferer fundamental frequency can be easily filtered, may be considerably easier to detect than its harmonic, and the resultant cancelling signal contains no low level wanted (ATG) signal, as in the implementation above, which might otherwise reduce the effect of the cancellation.

Furthermore, as the signal is sampled from a different frequency band and used to reproduce a replica of the interference in the communication frequency band, the system may be implemented using a single antenna, with the signal from the antenna being split via a coupler that, together with a filter forms a frequency diplexer, as described below. The coupler 304 is placed before any band-limited filter for the wanted ATG signal.

In the embodiment of FIG. 7, an antenna 302 is connected to a coupler 304 which is configured to split the signal received from the antenna into two branches. The first branch is a communication branch for receiving ATG communication signals and applying cancellation. The second branch is an interference branch that detects interference pulses at their fundamental frequency and generates a cancellation signal at a higher harmonic.

The coupler 304 is configured to split the signals received from the antenna 302. The antenna 302 might comprise an array or sub-array (a part of an array) comprising multiple antenna elements fed via a feeder network or may be a single antenna element within a larger antenna array.

The communication branch is a receive path that comprises a receive band filter 310, an interference detection module 312, a cancellation module 314, a downconverter and analogue to digital converter 316 and a modem 318. The interference branch comprises an interferer filter 320, a harmonic generator 322 and a gain control and phase shifter 324. A controller 326 (or processor) is connected to and controls the downconverter 318 and gain control and phase shifter 324.

The receive band filter 310 is a band pass filter that allows through the frequency band of the communication channel. It is also a band stop filter at the fundamental frequency of the interference signal. In this case, the receive band filter 310 is an LTE receive (Rx) band filter that passes ATG wireless transmissions received in the 2170-2185 MHz band and blocks the ATC fundamental frequency (1090 MHz). This includes passing the second harmonic of the ATC transmission at 2180 MHz.

The interference detection module 312 detects interference (for instance, a pulse of interference) and supplies a blanking signal to the controller 326 to allow the controller 326 to turn cancellation on and off based on the blanking signal. As discussed above, cancellation is only applied during the pulses. The blanking signal may be a composite blanking signal, as discussed above. Where interference from different sources is detected, the interference detection module 312 may be configured to indicate the source, or indicate the strength of the interference, to the controller 326 to allow the cancellation scaling to be adapted appropriately.

The cancellation module 314 is configured to receive a cancellation signal from the gain control and phase shifter 324 and subtract this signal from the received signal, as discussed above.

The downconverter and analogue to digital converter 316 is configured to convert the cancelled signal to baseband (if needed) and digitise the converted signal (if needed).

The modem 318 is configured to acquire and track the frequency of the received signal, demodulate the received signal and perform signal strength and quality measurements on the signal.

The system is controlled by a controller 326. The controller is a processor configured to control the modem 318 (for instance, the channel bandwidth) and the gain control and phase shifter 324 (for instance, the gain and phase shift that is applied to the replica signal). The controller 326 receives the blanking signal from the interference detection module 312 and is configured to turn cancellation on and off based on this signal by sending control signals to the gain control and phase shifter 324. Furthermore, the controller 326 is configured to adapt the scaling of the cancellation signal (e.g. to account for different interference sources) based on the blanking signal (e.g. based on the strength of the blanking signal).

With regard to the interference branch, the interferer filter 320 is a band pass filter that is tuned to pass the fundamental frequency of the pulsed interference signal. It is also a band stop filter at the frequency band of the communication channel. In this case, the interference signal is from an ATC beacon, so the interferer filter passes signals at a frequency of 1090 MHz. In the present case, the interferer filter 320 blocks the ATG frequency band (the LTE receive (Rx) 2170-2185 MHz band).

The harmonic generator 322 is configured to receive the interference signal and generate a harmonic interference signal at the higher harmonic that is present in the communication branch. In this case, the harmonic generator generates a signal at the second harmonic at 2080 MHz. The harmonic generator 322 comprises an amplifier and an appropriate non-linearity device or function. Harmonic generation may be performed in either the analogue or digital domains.

The harmonic interference signal is supplied to the gain control and phase shifter 324 which is configured to generate a replica pulsed interference signal based on the harmonic of the fundamental interference signal and the blanking signal. The replica pulsed interference signal (the cancellation signal) is generated by setting and/or tracking the amplitude and phase of the harmonic interference signal to match that of the interference signal present in the communication branch and by gating synchronised to the detected pulses during the blanking signal. This may involve setting the amplitude and phase in accordance with a predefined gain and phase shift (e.g. from a look-up table). The predefined gain and phase shift may be determined from an initial configuration in which the most effective gain and phase shift are determined. Alternatively, as discussed above, the gain and/or phase shift may be adjusted dynamically.

One important consideration is the design of the coupler 304 that splits the signal from the antenna 302 into the receive path and interferer band filter 320. This coupler should be designed to impose little loss in the main path, otherwise this will increase the noise in the receive system. To impose little loss the coupler 304 is configured to only couple a small amount into the second path. Alternatively, the coupling ratio may be frequency dependent in the form of a combined coupler/diplexer. The choice of coupler is eased by the fact that the interferer at the fundamental frequency is generally at a much higher level than the wanted signal, so that after reduction in the coupler suitable levels of interferer to noise are achievable.

Cancellation may be applied in either the analogue or digital domains. In the latter case, cancellation may be applied after the communication signal on the receive path has been digitised. The cancellation signal in this case may be formed using non-linear analogue function and then digitised or else digitised prior to using a non-linear digital function before being subtracted from the digitised communication signal.

Whilst the embodiment of FIG. 7 samples the interference signal from the same antenna as the communication signal, which reduces the footprint of the cancellation system, it may equally be sampled from a different antenna. For instance, a hybrid scheme may be implemented where the interference fundamental frequency is sampled from a first antenna (e.g. antenna 1 discussed above) and a cancellation signal is generated via a harmonic generator and applied to a signal at the interferer harmonic frequency detected at a second antenna (e.g. antenna 2 discuss above), wherein antenna 1 receives a stronger fundamental interference signal than antenna 2. This may be the used, for example, where the gain of antenna 2 in the direction of the interferer is not sufficient at the interferer fundamental frequency.

Different approaches to cancellation have been proposed herein. The methods described herein make use of spatial diversity, polarisation diversity and the sampling of different harmonics or a combination thereof, in order to derive an optimum cancellation signal that is subtracted from the received signal to remove interference. This is likely to be particularly effective for air to ground communication, although it may be equally applicable to any wireless system on a mobile platform, such as in aeronautical satellite communications.

Furthermore, whilst the above embodiments discuss the mitigation of pulsed interference, embodiments are equally applicable to cancelling non-pulsed interference. For instance, cancellation by sampling from different antennas/frequency domains, scaling to form a cancellation signal and subtracting the cancellation signal from a signal containing interference can be applied generally to any (e.g. pulsed or non-pulsed) interference in a wireless system. Nevertheless, it will be appreciated that, where the interference is pulsed, performance can be improved by applying cancellation only during the interference pulses.

Equally, whilst the above embodiments discuss cancellation of air traffic control (ATC) signals from air to ground (ATG), e.g. LTE, signals, the methods described herein are applicable to cancelling any form of interference signal.

Implementations of the subject matter and the operations described in this specification can be realized in digital electronic circuitry, or in computer software, firmware, or hardware, including the structures disclosed in this specification and their structural equivalents, or in combinations of one or more of them. For instance, hardware may include processors, microprocessors, electronic circuitry, electronic components, integrated circuits, etc. Implementations of the subject matter described in this specification can be realized using one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A system for mitigating interference from an interference signal, wherein the system comprises cancellation circuitry configured to:
   receive a first signal from a first antenna, the first signal comprising an interference component deriving from the interference signal and a desired component deriving from a desired signal;
   receive a second signal comprising an interference component deriving from the interference signal and received at one or more of a different antenna or a different frequency to the first signal, wherein the interference component in the second signal is stronger than the interference component in the first signal;
   derive a cancellation signal from the second signal;
   generate an output signal by subtracting the cancellation signal from the first signal to substantially remove the interference component from the first signal; and
   output the output signal, wherein:
the interference signal is a pulsed interference signal comprising a series of pulses of interference;
the system is configured to detect when a pulse of interference is received; and
the cancellation circuitry is configured to subtract the cancellation signal from the input signal only during each pulse.

2. The system of claim 1 wherein deriving the cancellation signal comprises generating a cancellation signal based on the second signal and adjusting one or more of:
an amplitude of the cancellation signal to match an amplitude of the interference component of the first signal; or
a phase of the cancellation signal to match a phase of the interference component of the first signal.

3. The system of claim 2 wherein the cancellation circuitry is further configured to:
identify when a source of interference in the first signal changes based on a change to the interference component of the first signal; and
in response to said identification, adjust one or more of:
the amplitude of the cancellation signal to match an updated amplitude of the interference component of the first signal; or
a phase of the cancellation signal to match an updated phase of the interference component of the first signal.

4. The system of claim 1 wherein the second signal is obtained via a second antenna, the second signal comprises a desired component deriving from the desired signal and the system is configured to, in response to the desired component of the first signal falling below one or more of a predefined threshold or a predefined level relative to the desired component of the second signal, output a pulse blanked version of the second signal.

5. The system of claim 1 wherein the first signal is obtained via a first antenna element of the first antenna, the second signal is obtained via a first antenna element of a second antenna, wherein each of the first and second antennas comprises a plurality of antenna elements, and wherein the first antenna element of the first antenna has the same polarisation as the first antenna element of the second antenna.

6. The system of claim 5 wherein the cancellation circuitry is further configured to, for each antenna element in the first antenna:
receive, from the respective antenna element in the first antenna, a corresponding signal comprising an interference component deriving from the interference signal and a desired component deriving from a corresponding desired signal;
receive, from each antenna element in the second antenna that shares the same polarisation as the respective antenna element of the first antenna, a respective signal comprising an interference component deriving from the interference signal;
derive a corresponding cancellation signal for the respective antenna of the first antenna based on the respective signal from each antenna element in the second antenna that shares the same polarisation as the respective antenna element of the first antenna;
generate a corresponding output signal by subtracting the corresponding cancellation signal from the corresponding signal to substantially remove the interference component from the corresponding signal; and
output the corresponding output signal.

7. The system of claim 1 wherein the system is configured to choose the second signal from a set of signals, each comprising a corresponding interference component deriving from the interference signal, wherein the second signal is chosen as the signal from the set of signals that has the strongest interference component.

8. The system of claim 1 wherein the output signal is generated by subtracting the cancellation signal from the first signal in response to a determination that the strength of the interference component of the first signal is greater than a predefined threshold interference strength.

9. The system of claim 1 further comprising a first filter configured to pass the first signal at a first frequency and a second filter configured to pass the second signal at a second frequency that is different to the first frequency.

10. The system of claim 9 wherein the first and second signals are received at the first antenna and passed to the first and second filters.

11. The system of claim 9 wherein the first and second frequencies are different harmonic frequencies of the interference signal.

12. The system of claim 11 wherein the second frequency is a fundamental frequency of the interference signal and the first frequency is a higher harmonic frequency than the fundamental frequency.

13. The system of claim 9 wherein deriving the cancellation signal from the second signal comprises generating a replica interference signal at the first frequency based on the second signal.

14. A method for mitigating interference from an interference signal, the method comprising cancellation circuitry:
receiving a first signal from a first antenna, the first signal comprising an interference component deriving from the interference signal and a desired component deriving from a desired signal;
receiving a second signal comprising an interference component deriving from the interference signal and received at one or more of a different antenna or a different frequency to the first signal, wherein the interference component in the second signal is stronger than the interference component in the first signal;
deriving a cancellation signal from the second signal;
generating an output signal by subtracting the cancellation signal from the input signal to substantially remove the interference component from the first signal; and
outputting the output signal,
wherein:
the interference signal is a pulsed interference signal comprising a series of pulses of interference;
the method further comprises detecting when a pulse of interference is received; and
the cancellation circuitry subtracts the cancellation signal from the input signal only during each pulse.

15. A system for mitigating interference from an interference signal, wherein the system comprises cancellation circuitry configured to:
receive a first signal from a first antenna, the first signal comprising an interference component deriving from the interference signal and a desired component deriving from a desired signal;
receive a second signal comprising an interference component deriving from the interference signal and received at one or more of a different antenna or a different frequency to the first signal, wherein the interference component in the second signal is stronger than the interference component in the first signal;

derive a cancellation signal from the second signal;

generate an output signal by subtracting the cancellation signal from the first signal to substantially remove the interference component from the first signal; and output the output signal, wherein the first signal is obtained via a first antenna element of the first antenna, the second signal is obtained via a first antenna element of a second antenna, wherein each of the first and second antennas comprises a plurality of antenna elements, and wherein the first antenna element of the first antenna has the same polarisation as the first antenna element of the second antenna, wherein the cancellation circuitry is further configured to, for each antenna element in the first antenna:

receive, from the respective antenna element in the first antenna, a corresponding signal comprising an interference component deriving from the interference signal and a desired component deriving from a corresponding desired signal;

receive, from each antenna element in the second antenna that shares the same polarisation as the respective antenna element of the first antenna, a respective signal comprising an interference component deriving from the interference signal;

derive a corresponding cancellation signal for the respective antenna of the first antenna based on the respective signal from each antenna element in the second antenna that shares the same polarisation as the respective antenna element of the first antenna;

generate a corresponding output signal by subtracting the corresponding cancellation signal from the corresponding signal to substantially remove the interference component from the corresponding signal; and output the corresponding output signal.

\* \* \* \* \*